Sept. 18, 1945.    E. KOPPELMAN    2,385,084
WINDSHIELD WIPER MOTOR
Filed July 25, 1944    3 Sheets-Sheet 1

Inventor
EDWARD KOPPELMAN
By Lindsey and Robillard
Attorney

Sept. 18, 1945.  E. KOPPELMAN  2,385,084
WINDSHIELD WIPER MOTOR
Filed July 25, 1944  3 Sheets-Sheet 2
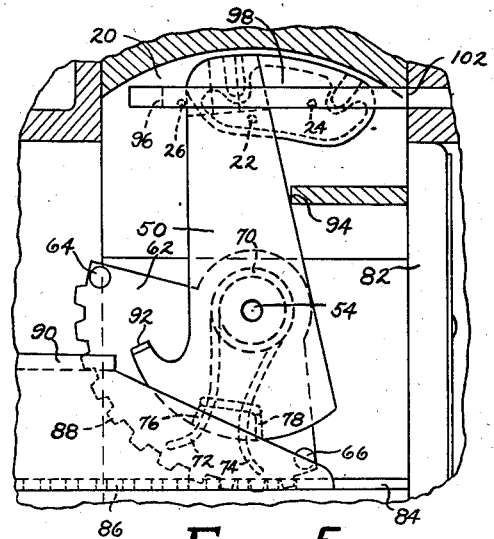
Fig-5
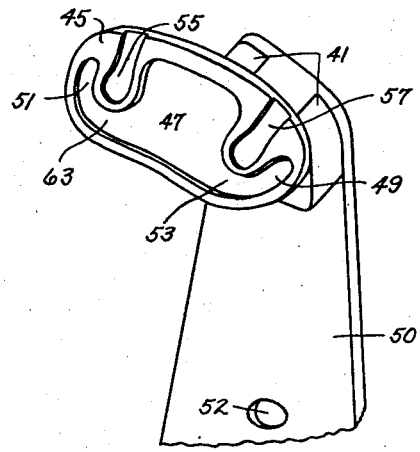
Fig-6
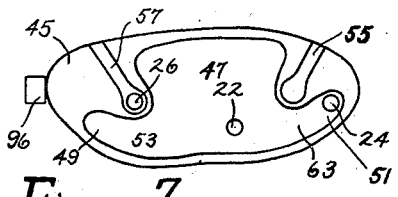
Fig-7
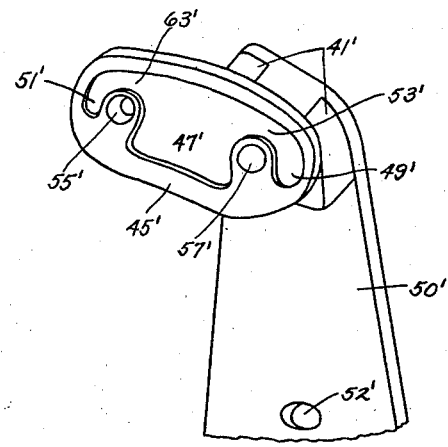
Fig-10
Fig-8
Fig-9
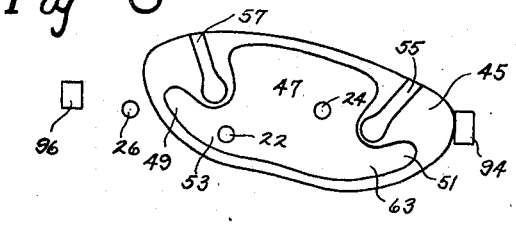
Inventor
EDWARD KOPPELMAN
By Lindsey and Robillard.
Attorney Patented Sept. 18, 1945

2,385,084

UNITED STATES PATENT OFFICE 2,385,084

WINDSHIELD WIPER MOTOR

Edward Koppelman, North Hollywood, Calif.

Application July 25, 1944, Serial No. 546,515

15 Claims. (Cl. 121—164)

The present invention relates to fluid operated motors and more particularly to motors of this type utilized for actuating windshield wipers.

One of the requisites for such a motor is that upon being rendered inactive the wiper arm becomes parked, that is, it is moved to and retained at the end of its stroke. Various means have been utilized for accomplishing the foregoing and an object of the present invention is to provide an improved means for accomplishing such a result.

Another object is to provide a motor wherein the complete operating cycle and parking is controlled by the oscillated valve which is common to this type of motor, and wherein upon being moved to parking position the oscillated valve is rendered inactive or inoperative but is not arrested. By this arrangement if the wiper arm is moved, such as when cleaning of the windshield occurs, the valve will not be damaged and regardless of what position the wiper arm is in when released the motor will operate to return it to parked position.

Other objects will be in part obvious and in part pointed out more in detail hereinafter.

The invention accordingly consists in the features of construction, combination of elements, and arrangement of parts which will be exemplified in the construction hereafter set forth and the scope of the application which will be indicated in the appended claims.

In the accompanying drawings:

Figs. 4 and 5 are fragmentary views similar to Fig. 2 and showing the oscillating valve in its successive positions during normal operations;

Fig. 6 is a perspective view of the valve looking at the operating face;

Figure 11:
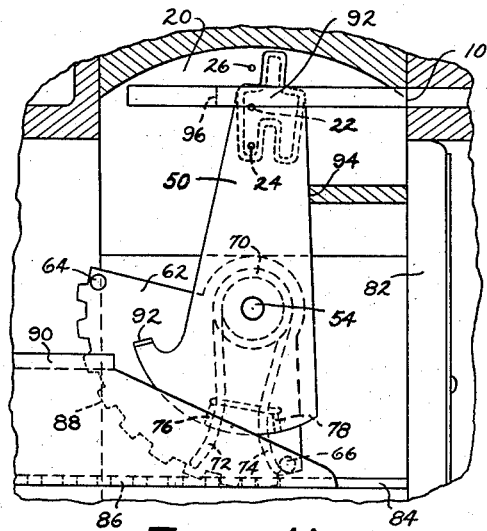
Figure 12:
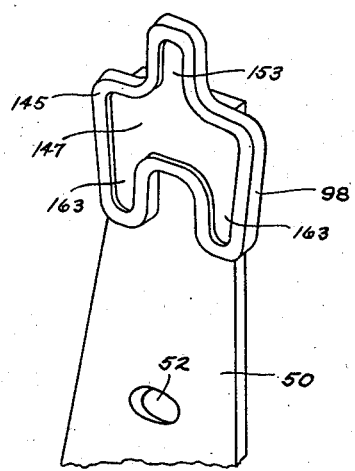
Figure 13:
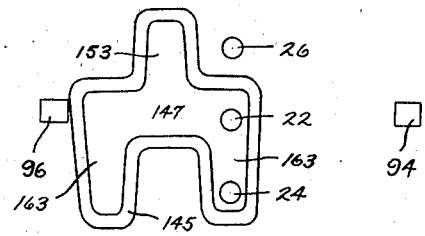
Figure 14:
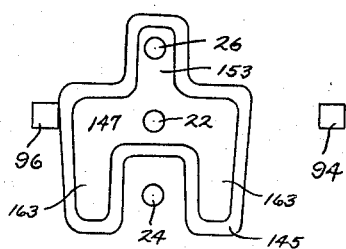
Figure 15:
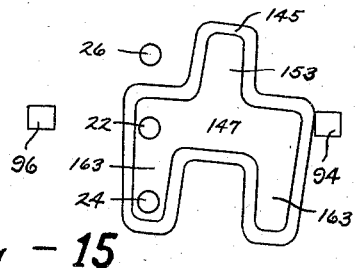

Figs. 7 to 9 inclusive are schematic drawings of the oscillating valve showing its various positions;

Fig. 10 is a perspective view similar to Fig. 6 of a modification of the valve shown in Fig. 6;

Fig. 11 is a view similar to Fig. 5 and showing a modified arrangement of parts and another embodiment of the oscillating valve;

Fig. 12 is a perspective view of the valve shown in Fig. 11 looking at the operating face; and Figs. 13 to 15 inclusive are schematic drawings of the valve shown in Figs. 11 and 12 showing its various positions.

Referring to the drawings, the motor is generally similar to that disclosed in Patent No. 2,263,003 issued to the same inventor and comprising a casing A having therein a reciprocating piston B, a valve C for alternately connecting the opposite ends of the casing to the source of fluid pressure for operating the piston, valve actuating means D and control means E.

More particularly, the casing A comprises opposed piston chambers 10 and 12 connected together by complementary front and rear members 14 and 16. The front and rear members 14 and 16 define therebetween a valve guideway, in which guideway the valve C is adapted to be oscillated on the inner face of the front member 14, which face constitutes a valve seat 20. The valve seat 20 is provided with three ports 22, 24, and 26. The central port 22 connects through a passage 28 to a passage 30 provided in the top wall of the piston chamber 10; the latter passage being open at its outer end and adapted to be connected to a source of motivating fluid such as the suction of an automobile engine. The right port 24 connects through a passage 32 to a passage 34 also provided in the top wall of the piston chamber 10 and connected at its outer end through an opening 36 to the interior of the piston chamber. In like manner, the left port 26 connects through a passage 38 to a passage 40 provided in the top wall of the piston chamber 12; the latter passage connecting at its outer end through an opening 42 into the piston chamber.

Figure 3:
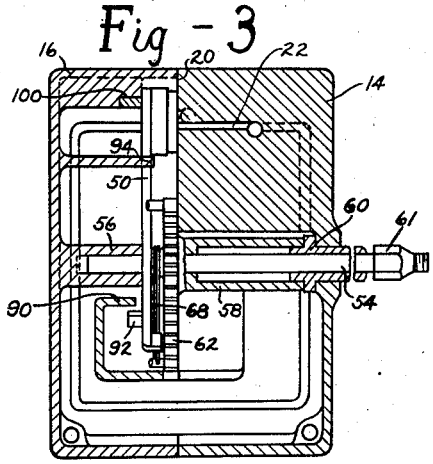
Fig. 3 is a view taken on the line 3—3 of Fig. 2.

Operating on the valve seat 20 and adapted to cooperate with the ports 22, 24, and 26 to control the motor is the valve C, details of which will be hereinafter described. To oscillate the valve C it is provided with a mounting member 41 slidable onto the end of an actuator arm 50, which arm is provided with an opening 52 intermediate of its ends for pivotally mounting same on the wiper actuating shaft 54. As best seen in Fig. 3, the shaft 54 is pivotally mounted at its inner end in a tubular bearing 56 provided on the inner face of the rear casing member 16, and the shaft then extends successively through the valve actuating arm 50, a sleeve 58, and a second sleeve 60 and carries on its outer end exterior of the motor a screw tip 61 for mounting a wiper arm thereon. The sleeve 58 is secured to the shaft 54 and has integral therewith a gear segment 62, which segment is provided with a pair of spaced stops 64 and 66. As indicated, the gear segment 62 is secured to the sleeve 58 forwardly of the valve actuator 50, and mounted on the sleeve intermediate of the valve actuating arm and the gear segment is an actuating spring 68. The spring 68 is formed with a coil 70 for pivotally mounting it on the sleeve 58 and spaced depending arms 72 and 74 which extend downwardly and are positioned between spaced fingers 76 and 78 provided on the valve actuating arm 50 beneath the pivot thereof.

For actuating the aforedescribed mechanism, the piston B comprises a pair of spaced piston members 80 and 82 each having a fluid and air-tight fit in their respective chambers and inter-connected by a rack member 84. The rack member 84 is provided with spaced teeth 86 meshing with teeth 88 of the gear segment 62, whereby upon reciprocating motion of the piston the gear will be oscillated to oscillate the shaft 54. In turn, when the gear segment is oscillated, the spaced stops 64 and 66 will alternately engage the spaced legs of the spring 68 to place same under tension and oscillate the valve. When it is desirable to prevent operation of the valve C until the piston has completed a predetermined stroke, there is carried by the piston a holding member 90 which reciprocates therewith and moves in a path intersecting a restraining member 92 carried by the valve actuating arm 50 beneath the pivot of the latter.

Figure 4:
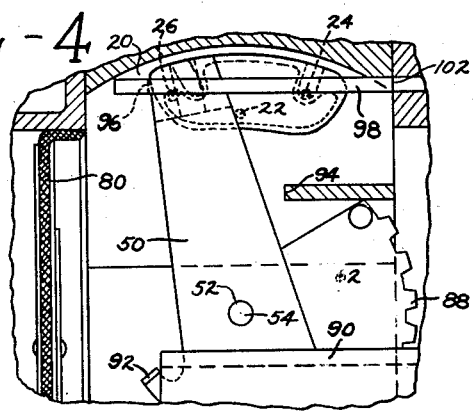

With this construction, when the valve is in the position shown in Fig. 4, the restraining member 92 will be just beneath the holding member 90, where, upon movement of the piston to the left, the holding member will move over and across the restraining member 92. Simultaneously, the pin 66 will likewise be oscillated until it engages the spring arm 74, whereupon it will tension the spring, tending to pivot the valve in a clockwise direction. Should the tension be sufficient to overcome the vacuum lock on the valve, the restraining member 92 will pivot into engagement with the holding member 90 to prevent the movement of the valve until the piston has completed its stroke, whereupon the holding member will have moved out of the path of the restraining member 92, permitting the valve to pivot. Upon pivoting, the valve will then assume a position wherein the restraining member 92 is just slightly above the holding member 90, and the latter will pass under same during the reverse travel.

The movement of valve C is controlled by control means E which means include a stop 96 adapted to cooperate with a stop 94 to limit movement of the valve. The stop 94 is fixed to the rear casing member 16; whereas the stop 96 is carried on the inner end of a horizontally arranged lever 98. The inner portion of the lever 98 is slidably mounted in a guide 100 provided in the rear casing member 16, and the outer end extends through an opening 102 just above the top wall of the piston chamber 10. At its outer end the lever 98 is turned upwardly to provide a finger 104 receivable within a slot 106 cut in a trigger member 108. The trigger member is further provided with a second slot 110 which is parallel to the longitudinal axis thereof and permits the mounting of the trigger member over a square stud 112 secured on the top wall of the piston chamber 10. To hold the trigger member in place, there is also provided a top plate 114 overlying the trigger member and secured to the stud 112 by a screw 116.

Figure 1:
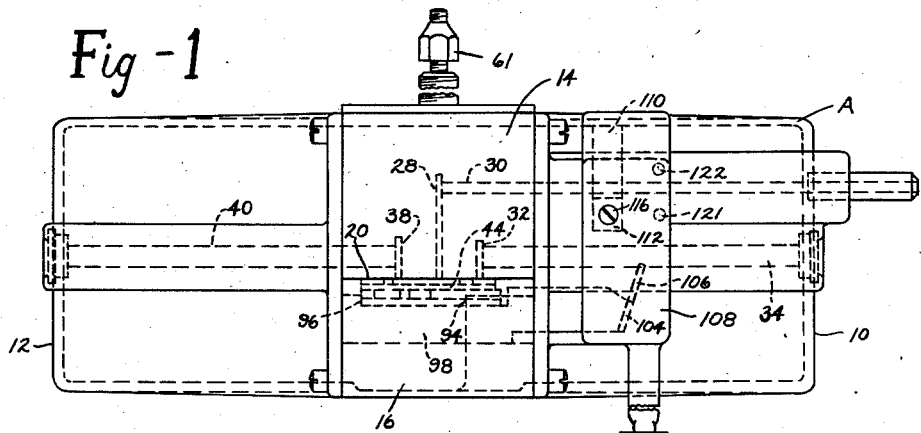
Fig. 1 is a plan view of a motor embodying the invention herein.

As seen in Fig. 1 the slot 110 is of greater length than the stud 112, whereby upon pulling of the handle 118 of the trigger member the latter may be moved forwardly. To cooperate with this movement, the slot 106 is arranged at an acute angle to the longitudinal axis, whereby it will cam the finger 104 to the right, simultaneously sliding the lever 98 to the right to move the stop 96 closer to the fixed stop 94.

When the stop 96 is at this latter position, as seen in Fig. 5, the valve 44 is so positioned that upon oscillation it will alternately connect the center port to one of the side ports, whereupon the motor will operate to oscillate the shaft 54 to operate the wiper arm carried thereby. However, when the trigger 108 is pushed inwardly, the stop 96 will be moved to the position shown in Fig. 2 and the valve will assume the position shown therein, whereupon operation of the motor will cease upon the wiper reaching parked position.

To hold the trigger 108 in either its operative or inoperative position, there is located beneath same a spring plate 120 having a detent 121 on its upper face receivable within openings 122 provided in the trigger member 108.

With the exception of valve means C and the positioning of ports 22, 24 and 26 the structure described is similar to and functions in like manner to that disclosed in the aforementioned patent. However, in the present instance when the valve C moves to its inactive position vacuum is maintained in the last operative connected chamber thus retaining the wiper in parked position.

To accomplish the foregoing the valve C has a face 45, adapted to ride on seat 20, the face being provided with a plurality of flow and escape channels for controlling the fluid flow, the flow channels being so arranged that regardless of the position of valve C the central and one side port are in communication and the escape channels so arranged that the port not in communication will be vented to atmosphere when the valve is in a position overlying same. More specifically the flow channels are formed by recessing the valve below the plane of the face 45 thereof to provide a central valve chamber 47 and auxiliary valve chambers 49 and 51 spaced laterally from the main chamber and connected thereto by passages 53 and 63. The escape channels are formed by recessing the face of the valve to provide passages 55 and 57 which open to atmosphere when valve C rests on seat 20.

As best seen in Fig. 6 the valve C is symmetrical to each side of a vertical center line whereby the valve may be utilized on either a right or left hand motor.

Figure 2:
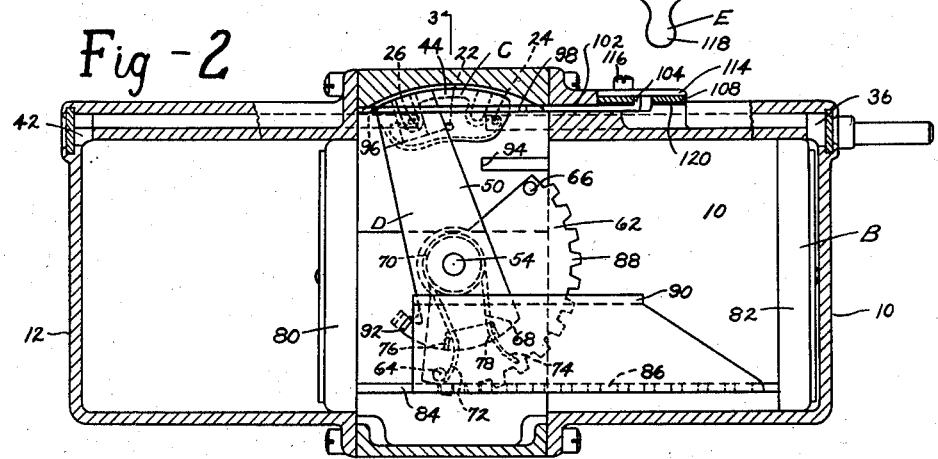
Fig. 2 is a front view with casing in section to show the details of construction and with the motor in parked position.

With the foregoing arrangement when the valve is in the inactive position shown in Figs. 1, 2 and 7 the motor is parked with port 22 and chamber port 24 in communication through passage 63 and passage port 26 vented to atmosphere through escape passage 57. Upon moving the control means forward stop 96 will move to the right carrying valve C with it and the parts will be positioned as shown in Figs. 4 and 8. The valve is now in operating position with suction port 20 in communication with chamber port 26 whereas chamber port 24 is vented to atmosphere through escape passage 55. The motor will now operate with the piston moving to the left. Upon completing its stroke valve C will be oscillated to the position shown in Figs. 5 and 9, whereupon the fluid connections are again reversed.

The valve is now in the alternate operating position with suction port 22 and chamber port 24 again in communication through chamber 47 whereas port 26 is vented to atmosphere. As long as stop 96 remains unchanged the motor will continue to operate and the valve shifted between its alternate operative positions. However, upon returning stop 96 to its inactive position, the motor will be brought to a stop. It will be noted that when the valve moves to the position of Fig. 9 the piston will as usual complete its stroke to the right and thereafter upon the valve moving to the position of Fig. 7 communication is momentarily broken and then reestablished between suction port 22 and the last connected chamber port 24 to maintain the motor in parked position.

Referring now to Fig. 10 there is shown a modified valve differing from that of Fig. 6 in that the escape channels 55' and 57' extend through the valve body and connecting passages 53' and 63' are located over rather than below the passages.

Referring now to the embodiment illustrated in Figs. 11 to 15 corresponding parts have been given corresponding numbers. It will be noted, however, that the suction and side ports 22, 24 and 26 are arranged in vertical alignment. To cooperate therewith, the valve has a face 145 adapted to ride on the valve seat and is recessed to form the flow channels for making the necessary fluid connections.

The flow channels herein also include a main chamber 147, auxiliary chamber 153 and spaced auxiliary chamber 163 connected to the main chamber. With this arrangement when stop 96 is in the overthrow position the valve will be positioned as shown in Fig. 13 with the center port 22 connected to side port 24. Upon shifting to the first operative position (Fig. 14) the center port 24 becomes connected with side port 26 whereupon operation starts. When the valve oscillates to the position shown in Fig. 15, center port 22 is again connected to side port 24 but through the opposite auxiliary chamber 163. So long as stop 96 remains in the on position shown in Figs. 14 and 15, the valve will oscillate between its operative position. However, when stop 96 is moved to its inactive or off position valve C will move to the overthrow or inactive position resulting in stopping of the motor and parking of the wiper arm.

From the foregoing, it will be seen that parking is accomplished by moving the valve to a position where it is rendered inactive or inoperative without arresting it or restricting it against movement. This also results in the motor stopping and, upon moving the valve to the first operative position, automatic starting of the motor occurs.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination with a motor including a valve seat having a central and side ports with means for oscillating a valve on said seat between alternate operative positions and to an inactive position, a valve provided with flow channels for connecting said central port with a side port when in alternate operative positions and different flow channels for connecting the central port with a side port when in inactive position.

2. In combination with a motor including a valve seat having a central and side ports with means for oscillating a valve on said seat between alternate operative positions and to an inactive position, a valve provided with flow channels for connecting said central port with a side port when in alternate operative positions, different flow channels for connecting the central port with a side port when in inactive position and escape channels alignable with a side port when the valve overlaps same.

3. In combination with a motor including a valve seat having a central and side ports with means for oscillating a valve on said seat between alternate operative positions and to an inactive position, a valve provided with flow channels for maintaining one side port in fluid communication with the central port in any position of the valve and escape channels for venting the side port not in communication with the central port when the valve straddles such port.

4. In combination with a motor including a valve seat having a central and side ports with means for oscillating a valve on said seat between alternate operative positions and to an inactive position, a valve provided with flow passages for connecting the central port with the first side port when in inactive position, different flow passages for connecting the central port and the second side port when the valve is in one operative position and still other flow passages for connecting the first side port with the central port when the valve is in its alternate operative position.

5. In combination with a motor including a valve seat having a central and side ports with means for oscillating a valve on said seat between alternate operative positions and to an inactive position, a valve provided with flow passages for connecting the central port with the first side port when in inactive position, different flow passages for connecting the central port and the second side port when the valve is in one operative position and still other flow passages for connecting the first side port with the central port when the valve is in its alternate operative position, and escape passages for venting the second side port to atmosphere when the valve is in inactive position and for venting first side port to atmosphere when the valve is in its first operative position.

6. In combination with a motor including a valve seat having a central and side ports with means for oscillating a valve on said seat between alternate operative positions and to an inactive position, a valve movable on the seat, said valve being provided with a central chamber and auxiliary chambers located to either side thereof and connected by passages thereto whereby said center port will be connected to one of the side ports in any position of the valve.

7. In combination with a motor including a valve seat having a suction port and side ports with means for oscillating a valve on said seat between alternate operative positions and an inactive position, a valve provided with flow channels therein for connecting the suction port with one of the side ports when the valve is in inactive or one operative position and for connecting the suction port with the other chamber port when the valve is in its other operative position.

8. In combination with a motor including a valve seat having a suction port and side ports with means for oscillating a valve on said seat to three different positions, a valve movable on said seat, said valve being provided with flow channels for connecting one of said side ports with central port in either of two positions of the valve and for connecting the central port with one of said ports in a third position of the valve.

9. In a motor of the character described, a valve seat having a center port and spaced side ports, a valve movable on said valve seat between two operative positions and to a third inoperative position, said valve including flow channels for connecting said center port with one of the side ports in any position of the valve.

10. In a motor of the character described, a valve seat having a central port and spaced side ports, a valve movable on said valve seat between two operative positions and to a third inoperative position, said valve having flow channels for connecting the same said side port with the center port in one operative position and the inoperative position of the valve, and other flow channels for connecting the other side port with the central port in the other operative position of the valve.

11. In a motor of the character described, a valve seat having a center and spaced side ports arranged in vertical alignment, a valve movable on said valve seat between two operative positions and to an inactive position, said valve having flow channels for connecting the same side port with the center port in one operative position and the inactive position of the valve, and other flow channels for connecting the other side port with the central port in the other operative position of the valve.

12. In a motor of the character described, a valve seat having a center and spaced side ports, a valve movable on said valve seat between two operative positions and to an inactive position, said valve having flow channels for connecting the same side port with the center port in one operative position and the inactive position of the valve, and other flow channels for connecting the other side port with the central port in the other operative position of the valve.

13. In a motor of the character described, a casing, a piston operable within the casing, said casing including a suction passage and separate passages, one leading to each end of the piston, a valve movable between two operative positions whereby it will alternately connect the suction passage with one of the other passages and to an inactive position where it connects one of the passages to the suction passage, means normally limiting the movement of the valve to the position where it alternately connects the suction passage with one of the other passages, said means being adjustable to permit the valve to move to said inactive position, and means operable by the piston for moving said valve to any of said positions.

14. In a motor of the character described, a casing having a valve seat provided with a center and spaced side ports, a valve movable on the seat to three positions, said valve having a main chamber and spaced auxiliary chambers communicating with the main chamber, said ports and chambers being so positioned that said center port communicates with the main chamber in all positions of the valve and one only of the side ports communicates with the main chamber through an auxiliary chamber in any position of the valve.

15. In a motor of the character described, a casing having a valve seat provided with a center port and a pair of spaced side ports, a valve movable on said seat to three positions, said valve including a main chamber and spaced auxiliary chambers communicating with the main chamber, said ports and chambers being so positioned that the main chamber communicates with the center port in all positions of the valve, one side port communicates with the main chamber through an auxiliary chamber in two positions of the valve and is out of communication in the third position and the other side port communicate with the main chamber through an auxiliary chamber in the third position of the valve and is out of communication in the other two positions.

EDWARD KOPPELMAN.